United States Patent [19]

Takanashi et al.

[11] Patent Number: 4,578,699

[45] Date of Patent: Mar. 25, 1986

[54] COLOR CAMERA WITH STRIPE FILTER USING CONTROLLED BIAS LIGHT FOR DARK SCENE NOISE IMPROVEMENT

[75] Inventors: Itsuo Takanashi, Yokohama; Shintaro Nakagaki, Fujisawa; Kenichi Miyazaki, Yokohama; Takashi Kuriyama, Tokyo, all of Japan

[73] Assignee: Victor Company of Japan, Limited, Kanagawa, Japan

[21] Appl. No.: 555,863

[22] Filed: Nov. 28, 1983

[30] Foreign Application Priority Data

Nov. 26, 1982 [JP] Japan .................. 57-207265

[51] Int. Cl.[4] .................. H04N 9/07; H04N 9/04
[52] U.S. Cl. .................. 358/44; 358/55
[58] Field of Search .................. 350/173; 358/55, 225, 358/41, 43, 44, 47, 50, 52, 223

[56] References Cited

U.S. PATENT DOCUMENTS 3,846,579 11/1974 Takanashi et al. .................. 358/47
4,143,399  3/1979 Nagahara et al. .................. 358/44
4,422,722 12/1983 Higuchi et al. .................. 358/55

FOREIGN PATENT DOCUMENTS 186285 10/1983 Japan .................. 358/55

Primary Examiner—Michael A. Masinick
Assistant Examiner—Randall S. Svihla
Attorney, Agent, or Firm—Jordan and Hamburg

[57] ABSTRACT

A color TV imaging apparatus comprises a TV imaging device for generating a composite color TV video signal by use of a color separation stripe filter, at least two demodulators for individually producing color signal components by demodulating a carrier signal which is generated as an output signal from the imaging device, and a bias light supply device for applying bias light to a photoelectric transducer section of the imaging device through the filter. At least one of the quantity and color temperature of the bias light is set such that the carrier color signals to be demodulated by the demodulators become greater than the peak-to-peak value of noise contained in the signal. The quantity of bias light is adjusted by controlling bias light sources of the bias light supply device, while a color temperature of bias light is selected by means of color temperature conversion filters positioned in light outlet portions of a flat light conducting element which is included in the bias light supply device.

7 Claims, 9 Drawing Figures

COLOR CAMERA WITH STRIPE FILTER USING CONTROLLED BIAS LIGHT FOR DARK SCENE NOISE IMPROVEMENT

BACKGROUND OF THE INVENTION

Reference is made to copending U.S. patent application Ser. No. 555,864 filed 11-23-83 and Ser. No. 555,865 filed 11-23-83.

The present invention relates to a color television (TV) imaging apparatus with an image tube which is capable of generating composite color TV video signals by means of a color separation stripe filter. More particularly, the present invention is concerned with a color TV imaging apparatus which improves color reproducibility in a dark scene and produced a high quality picture with a good S/N ratio.

A modern color TV camera employs a color TV imaging device in which a color separation stripe filter is disposed in a photoelectric transducer section to generate composite color TV video signals. Typical of such color TV camera is a single tube type color TV camera which uses as its imaging device an image tube having a photoelectric transducer section with a color separation stripe filter, or single plate type color TV camera whose imaging device is a solid state image sensor having a photoelectric transducer section with a color separation stripe filter. Because such types of TV cameras are easy to produce in a simple, compact and lightweight construction, exclusive study has been conducted for better performance and maneuvability for public use. Indeed, various types of products with such capabilities are now in the market. In a color separation stripe filter of the type described, a plurality of color stripes are arranged in a predetermined repetition mode, at least one color of the stripes being a complementary color. Generally, a color TV camera comprises a color TV imaging device using the stripe filter to generate a composite color TV video signal, and at least two demodulators for producing color signal components by demodulating color signals which are contained in an output signal of the imaging device and processed into carriers as will be described. The imaging element includes a photoconductive layer in the photoelectric transducer section.

Figure 1:
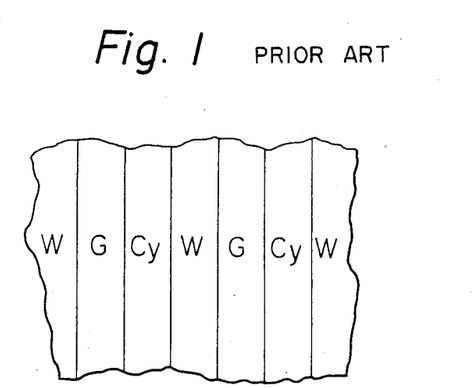
FIGS. 1 and 2 are fragmentary plan views of different examples of a color separation stripe filter.
Figure 2:
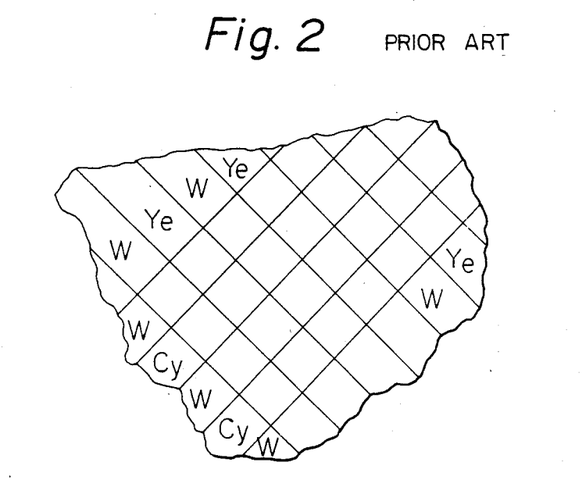

Examples of the color separation stripe filter applicable to a color TV camera are shown in FIGS. 1 and 2. In FIG. 1, the filter has therein stripes W transparent for all color light, stripes G transparent for green light, and stripes Cy transparent for cyan light. The stripes W, G and Cy are arranged in a predetermined repetition sequence. In FIG. 2, the filter has therein stripes W transparent for all color light, stripes Ye transparent for yellow light, and stripes Cy transparent for cyan light, the stripes being arranged in a predetermined repetition mode.

A composite color TV video signal output from the imaging device with the filter shown in FIG. 1 or 2 is applied to a first low pass filter to become a brightness signal having a predetermined wide frequency band, to a second low pass filter to become a brightness signal having a predetermined narrow frequency band, and to a band pass filter. From the band pass filter, the video signal is fed to a red and blue (RB) separator circuit which then produces two different signals which are to be demodulated.

The two signals mentioned above are individually demodulated by discrete demodulators in the imaging apparatus. The resulting red signal and blue signal are delivered to a matrix circuit together with the narrow band brightness signal output from the second low pass filter. As a result, signals representing three primary colors, red, blue and green, individually appear at output terminals of the matrix circuit. Further, detailed explanation of this type of color signal processing for a single tube color camera may be found in U.S. Pat. No. 3,846,579 by same applicant.

By the above procedure, the composite color TV video signal output from the imaging device is processed into three primary color signals. A problem encountered with this type of color TV camera is that color reproducibility is poor in a dark scene (dark area). In light of this, we have extended study and research to clear up the cause of deterioration in the color reproducibility in a dark scene and found that such deterioration does not occur when the signals to be demodulated are greater than the peak-to-peak value of noise contained in the signals. This is the principle which opened up the way for further improvements.

Now, in a composite color TV video signal output from an image tube with a color separation stripe filter, a high frequency component appears as if a carrier wave having a frequency corresponding to the repetition frequency of the stripes in the filter and subjected to balanced modulation by a color signal. This specific kind of signal will hereinafter be referred to as "carrier color signal" for convenience. Assume that the carrier color signal applied as an input signal to a demodulator is C and the noise appearing at the input of the demodulator is n, which are respectively expressed as:

$$C = Ec \sin(\omega_c t + \phi_c) \qquad \text{Eq. (1)}$$

$$n = En \sin(\omega_n t + \phi_n) \qquad \text{Eq. (2)}$$

Assuming that the signal applied to the demodulator is S, it is the sum of the signal C produced by the Eq. (1) and the noise n produced by the Eq. (2):

$$S = C + n \qquad \text{Eq. (3)}$$

Expansion of the Eq. (3) results in:

$$S = \{E^2c + E^2n + 2EcEn \cos(\Delta\omega t + \phi_n - \phi_c)\}^{\frac{1}{2}} \times \qquad \text{Eq. (3a)}$$

$$\sin\left(\omega_c t + \phi_c + \tan^{-1}\frac{En \sin(\Delta\omega t + \phi_n - \phi_c)}{Ec + En \cos(\Delta\omega t + \phi_n - \phi_c)}\right)$$

where $$\Delta\omega t = \omega_n t - \omega_c t$$

Assuming that a signal produced by amplitude demodulation of the signal S shown above is Sd, it is expressed as follows:

$$Sd = \{E^2c + E^2n + 2EcEn \cos(\Delta\omega t + \phi_n - \phi_c)\}^{\frac{1}{2}} \qquad \text{Eq. (4)}$$

$$= Ec\left\{1 + \left(\frac{En}{Ec}\right)^2\right\}^{\frac{1}{2}}\left\{1 + \frac{2En/Ec}{1 + (En/Ec)^2}\cos\right.$$

-continued $$(\Delta\omega t + \phi_n - \phi_c)\}^{\frac{1}{2}}$$

Closely examining the Eq. (4), the signal Sd may be produced as follows depending upon the condition:

when $Ec >> En$ $$Sd = Ec + En \cos(\Delta\omega t + \phi_n - \phi_c) \qquad \text{Eq. (5)}$$

when $Ec << En$ $$Sd = En + Ec \cos(\Delta\omega t + \phi_n - \phi_c) \qquad \text{Eq. (6)}$$

when $Ec = En$ $$Sd = Ec\{1 + (En/Ec)^2\}^{\frac{1}{2}}\{1 + \cos(\Delta\omega t + \phi_n - \phi_c)\}^{\frac{1}{2}} \qquad \text{Eq. (7)}$$

when Ec nearly equals En $$Sd = Ec\{1 + (En/Ec)^2\}^{\frac{1}{2}}\left(1 + \frac{a}{2}\cos A - \frac{1}{8}a^2\cos^2 A + \frac{1}{16}a^3\cos^3 A - \frac{5}{128}a^4\cos^4 A + \frac{35}{1024}a^5\cos^5 A - \frac{63}{2048}a^6\cos^6 A + \ldots\right) \qquad \text{Eq. (8)}$$

where $$a = \frac{2Ec/Ec}{1 + (En/Ec)^2},$$

$A = \Delta\omega t + \phi_n - \phi_c$.

It will be seen from the above that the amplitude-demodulated signal Sd is represented by the Eqs. (4)–(8) depending upon the amplitude relationship between Ec and En.

When the amplitude-demodulated signal Sd appears as a picture on a tube, the viewer integrates it with his eyes to recognize it as a signal Sdd which has a mean value of the signal Sd with respect to time. Therefore, the signal Sdd corresponds to the DC terms of the Eqs. (5)–(8) and is expressed as:

when $Ec >> En$    $Sdd = Ec$    Eq. (9)
when $Ec << En$    $Sdd = En$    Eq. (10)
when $Ec = En$ $$Sdd = 2\sqrt{2}/\pi\{E^2c + E^2n\}^{\frac{1}{2}} = \frac{4}{\pi}Ec = \frac{4}{\pi}En \qquad \text{Eq. (11)}$$

when Ec nearly equals En $$Sdd = Ec\{1 + (En/Ec)^2\}^{\frac{1}{2}}\left(1 - \frac{b^2}{4} - \frac{15b^4}{64} - \frac{315b^6}{512} \ldots\right) \qquad \text{Eq. (12)}$$

where $b = \frac{En/Ec}{(1 + En/Ec)^2}$.

The relationship between Ec and the signal Sdd represented by the Eqs. (9)–(12) is indicated by a solid curve in FIG. 4, in which the characteristic indicated by a dotted line is ideal one attainable when the noise En is zero. As will be understood from FIG. 4, a level offset corresponding to the noise is added to the signal Sdd in a dark area thereby masking the pure signal component.

Figure 3:
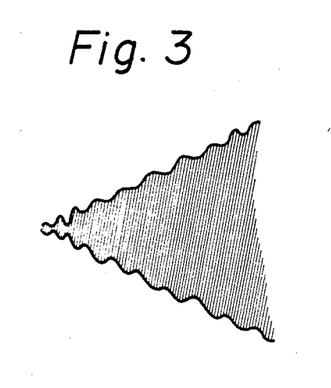
FIG. 3 is a diagram of an exemplary signal waveform of carrier signal output of an imaging device.
Figure 4:
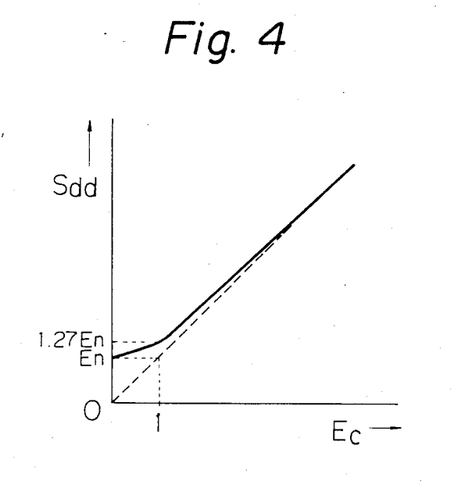
FIG. 4 is a graph showing a level characteristic curve of a color signal component derived from the carrier color signal of the imaging device.

When the carrier output signal of the image tube increases as the envelope thereof is shown in FIG. 3, the demodulated signal Sdd naturally follows the solid curve shown in FIG. 4. As clearly shown in FIG. 4, in the range where $Ec > 1$, Ec and Sdd are substantially linearly proportional to each other while in the range where $Ec < 1$, the original signal is hardly produced and the color reproducibility in dark areas is masked by noise.

In this manner, concerning a color signal produced by demodulation, the color reproducibility is significantly deteriorated in dark areas when the signal before demodulation becomes smaller than the peak-to-peak value of the noise contained therein. On the other hand, the signal such as $Y_L$ in FIG. 5 which is not subject to demodulation, is not deteriorated in dark areas so that as a result of matrixing with two other denodulated signals white balance will be upset in dark areas if no correction is made.

SUMMARY OF THE INVENTION

It is therefore an object of the present invention to provide a color TV imaging apparatus which allows a minimum of deterioration to occur in the color reproducibility in a dark scene due to noise and reproduces a picture with a desirable S/N ratio.

It is another object of the present invention to provide a generally improved color TV imaging apparatus.

A color television imaging apparatus with improved color reproducibility of a dark area of a scene deteriorated due to noise of the present invention comprises a color television imaging device for generating a composite color television video signal, the device including a photoelectric transducer section, a color separation stripe filter, at least two demodulators for individually producing color signal components by demodulating color signals in a form of carrier each of which is derived from an output signal of the imaging device, a bias light supply source for applying bias light to the photoelectric transducer section of the imaging device through the color separation stripe filter, and bias light control means for maintaining the carrier color signals to be demodulated at a value which is greater than the peak-to-peak value of noise which is contained in the color signals by controlling the brightness and/or color temperature of the bias light supply source.

In accordance with the present invention, a color TV imaging apparatus comprises a TV imaging device for generating a composite color TV video signal by use of a color separation stripe filter, at least two demodulators for individually producing color signal components by demodulating a carrier color signal which is generated as an output signal from the imaging device, and a bias light supply device for applying bias light to a photoelectric transducer section of the imaging device through the color separation filter. Either the brightness or the color temperature of the bias light or both are controlled such that the carrier color signals to be demodulated by the demodulators become greater than the peak-to-peak value of the noise contained in the signal. The quantity of the bias light is adjusted by controlling bias light sources of the bias light supply device, while a color temperature of the bias light is selected by means of a color temperature conversion filters positioned in light outlet portions of a flat light conducting element which is included in the bias light supply device.

The above and other objects, features and advantages of the present invention will become apparent from the following detailed description taken with the accompanying drawings.

DESCRIPTION OF THE PREFERRED EMBODIMENT

While the color TV imaging apparatus of the present invention is susceptible of numerous physical embodiments, depending upon the environment and requirements of use, a substantial number of the herein shown and described embodiment have been made, tested and used, and all have performed in an eminently satisfactory manner.

Figure 5:
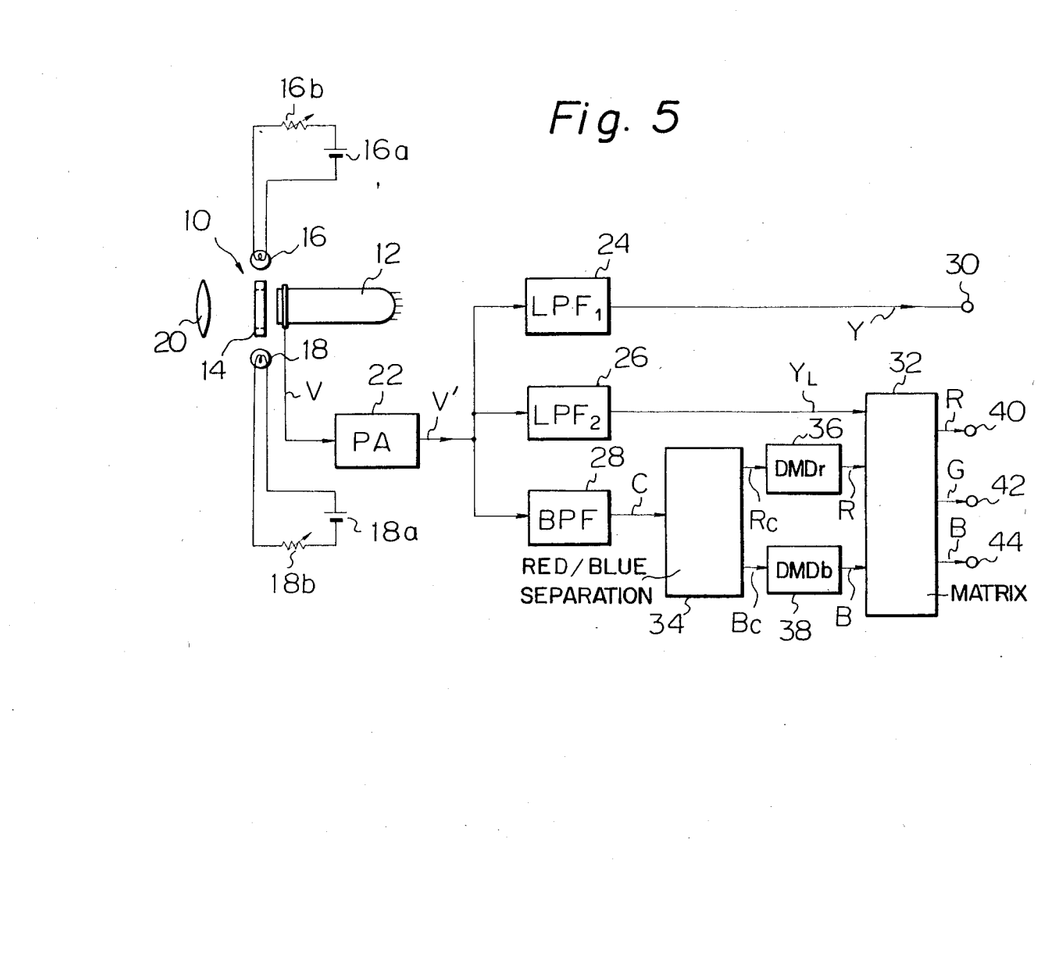
FIG. 5 is a block diagram of a color TV imaging apparatus embodying the present invention.
Figure 6:
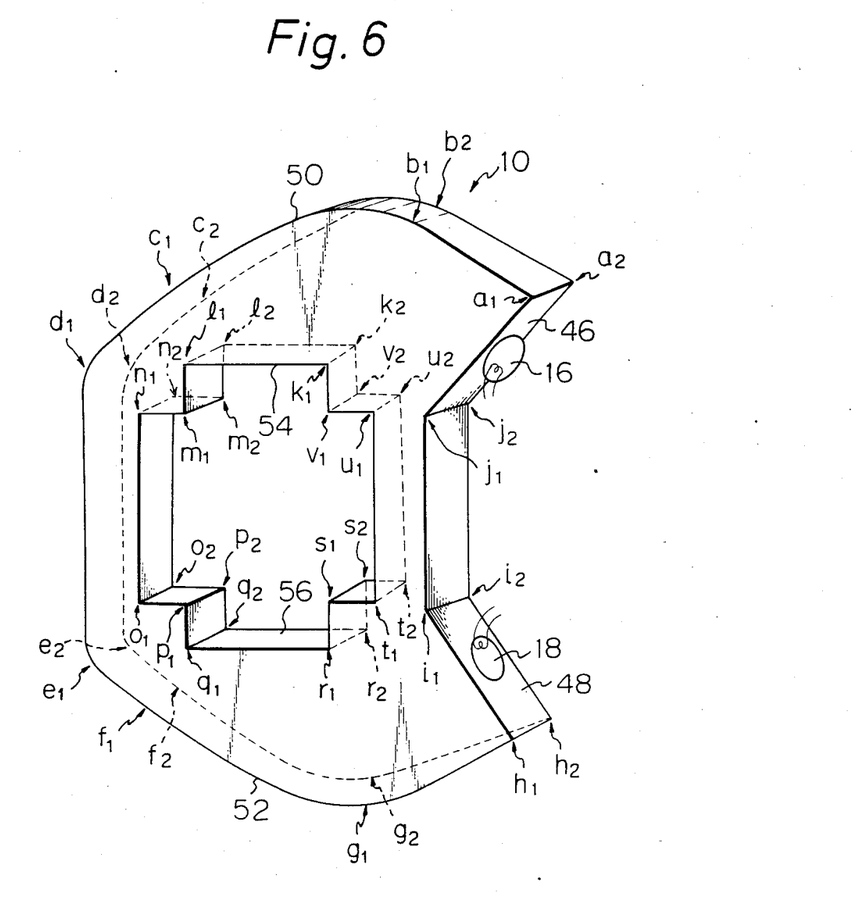
FIG. 6 is a perspective view of an example of a bias light supply device included in the imaging device of FIG. 5.
Figure 7:
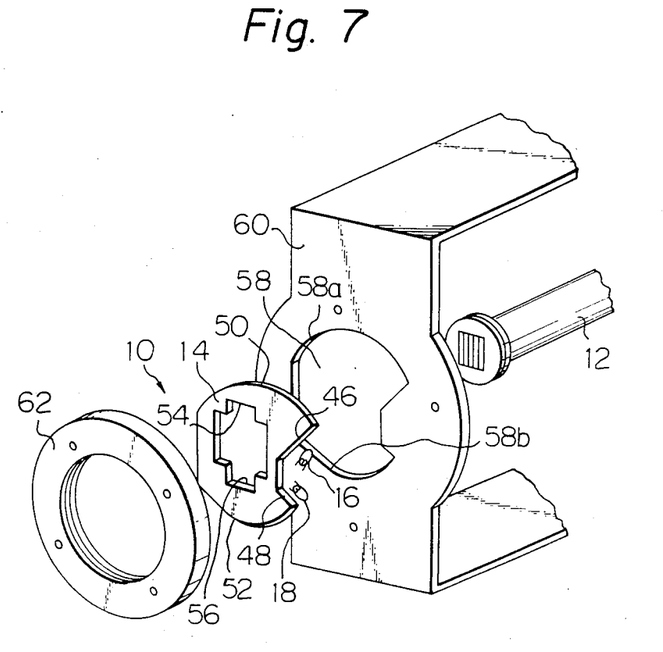
FIG. 7 is a fragmentary exploded perspective view of a color TV camera to which the present invention is applicable.

Reference will be made to FIGS. 5-9 for describing a color TV imaging apparatus embodying the present invention. The imaging apparatus is shown in a block diagram in FIG. 5. FIG. 6 shows in a perspective view an exemplary construction of a bias light supply device for applying bias light to a color TV imaging device. FIG. 7 is an exploded fragmentary perspective view of the imaging apparatus. In this particular embodiment, the color TV imaging device comprises an image tube by way of example.

In FIG. 5, the bias light supply device 10, generally applies bias light to a photoelectric transducer section of an image tube 12 through a color separation stripe filter (not shown). The device 10 comprises a flat light conducting member 14 and a pair of light sources 16 and 18 for supplying bias light. The light sources 16 and 18 may be respectively energized by power sources 16a and 18a and controlled by variable resistors 16b and 18b to emit variable quantities of light. Details of the bias light supply device 10 will be described later with reference to FIGS. 6 and 9. The image of an object is focused by a lens 20 to a photoconductive layer in the photoelectric transducer section of the image tube 12 through a color separating stripe filter such as shown in FIG. 1 or 2. The image tube 12 produces a color composite TV video signal V which is then applied to a preamplifier 22.

The video signal V' output from the preamplifier 22 is fed to a first low pass filter 24 for providing a wide band brightness signal, a second low pass filter 26 for providing a narrow band brightness signal, and a band pass filter 28 for extracting a high frequency signal (carrier color signal). The first low pass filter 24 delivers a brightness signal Y to a terminal 30, the second low pass filter 26 delivers a narrow band brightness signal $V_L$ to a matrix circuit 32, and the band pass filter 28 extracts a carrier color signal C and applies it to a red and blue (RB) separation circuit 34.

The RB separation circuit or separator 34 separates the input color signal C into a carrier red signal Rc and a carrier blue signal Bc which are applied to demodulators 36 and 38 respectively. The demodulator 36 supplies the matrix circuit 32 with a red signal R, and the demodulator 38 supplies the matrix circuit 32 with a blue signal B. The matrix circuit 32 processes the incoming narrow band brightness signal $Y_L$, red signal R and blue signal B to generate signals representative of three primary colors, red, green and blue. The red, green and blue signals are applied to output terminals 40, 42 and 44 respectively.

In the color TV camera of the present invention, color reproducibility in dark areas is improved by pre-setting one or both of quantity and color temperature of bias light applied from the device 10 to the photoelectric transducer section of the imaging device through the filter, such that the carrier color signals applied to the demodulators 36 and 38 (carrier red signal Rc and carrier blue signal Bc in this embodiment) individually become greater than the peak-to-peak value of noise appearing at the input terminals of the demodulators 36 and 38.

A construction of the bias light supply device 10 suitable for the color TV imager of the present invention will be described with reference to FIGS. 6 and 9.

In FIG. 6, the flat light conducting member or light conductor 14 is made of a light transmitting material such as acrylic resin or glass. As shown, the light conductor 14 comprises light inlet portions 46 and 48 on which rays emanating from the light sources 16 and 18 become incident respectively, reflective portions 50 and 52 each having a parabolic section for reflecting the light rays incident on the light inlet portion 46 or 48 associated therewith, and light outlet portions 54 and 56 at which the light rays reflected by the portions 50 and 52 leave the light conductor 14. Light from the light source 16 enters the light conductor 14 at the light inlet portion 46 and leaves it as bias light at the light outlet portion 54 reflected by the reflective portion 50. Likewise, light from the light source 18 propagates through the light inlet portion 48, reflective portion 52 and light outlet portion 56, leaving the light conductor 14 as bias light. While two light sources 16 and 18 are shown in the embodiment of FIG. 6, an arrangement may be made such that the two paths for light propagation are supplied by a single light source.

It is a primary requisite that the light rays from the light sources 16 and 18 be directed only toward the light inlet portions 46 and 48 of the light conductor 14 that is, light rays issuing in directions other than that toward the light inlet portions 46 and 48 be prevented from leaking to the outside. This is readily attainable by arranging the configuration of the lamps 16 and 18 themselves or that of a lamp housing (not shown). Meanwhile, the portions of the light conductor 14 other than the light inlet portions 46 and 48 and light outlet portions 54 and 56, and reflective portions 50 and 52 are entirely coated black for light interception, so that unnecessary light rays may be prevented from leaking to the outside.

In detail, the black coating for light interception is applied to all the portions other than the ligth inlet portions 46 (area defined by points $a_1$, $a_2$, $j_2$ and $j_1$) and 48 (area defined by points $h_1$, $h_2$, $i_2$ and $i_1$), light outlet portions 54 (area defined by points $l_1$, $k_1$, $k_2$ and $l_2$), and 56 (area defined by points $q_1$, $r_1$, $r_2$ and $q_2$), and reflective portions 50 (area defined by points $b_1$, $b_2$, $c_2$ and $c_1$) and 52 (area defined by points $g_1$, $g_2$, $f_2$ and $f_1$), i.e., an area defined by points $j_1$, $i_1$, $i_2$ and $j_2$, an area defined by points $b_1$, $a_1$, $a_2$ and $b_2$, an area defined by points $g_1$, $h_1$, $h_2$ and $g_2$, an area defined by points $c_1$, $d_1$, $e_1$, $f_1$, $f_2$, $e_2$, and $d_2$ and $c_2$, an area defined by points $k_1$, $v_1$, $u_1$, $t_1$, $s_1$, $r_1$, $r_2$, $s_2$, $t_2$, $u_2$, $v_2$ and $k_2$, an area defined by points $l_1$, $m_1$, $n_1$, $o_1$, $p_1$, $q_1$, $q_2$, $p_2$, $o_2$, $n_2$, $m_2$ and $l_2$, an area defined by a curve interconnecting points $a_1$, $b_1$, $c_1$, ..., $g_1$, $h_1$, $i_1$, $j_1$ and $a_1$ and a curve interconnecting points $k_1$, $l_1$, $m_1$, $n_1$, $o_1$, ..., $t_1$, $u_1$, $v_1$ and $k_1$, and an area defined by a curve interconnecting points $a_2$, $b_2$, $c_2$, $d_2$, ..., $g_2$, $h_2$, $i_2$, $j_2$ and $a_2$ and a curve interconnecting points $k_2$, $l_2$, $m_2$, $n_2$, $o_2$, ..., $t_2$, $u_2$, $v_2$ and $k_2$.

The flat light conducting element 14 is coupled in an opening 58 which is formed through a wall of a camera housing or box 60, as shown in FIG. 7. The position of the light conductor 14 is such that its opposite major surfaces extend parallel to the surface of the photoelectric transducer section of the image tube (color TV imaging device) 12. Among all the walls which define the opening 58, those 58a and 58b corresponding to the reflective portions 50 and 52 of the light conductor 14 are finished to mirror surface so that the light rays entering the light conductor 14 may be efficiently reflected by the portions 50 and 52 toward the light outlet portions 54 and 56 respectively, when the light conductor 14 is fit in the opening 58. It will be apparent to those skilled in this art that light reflecting films may be evaporated or otherwise deposited on the outer surfaces of the reflective sections 50 and 52.

The opening 58 in the camera casing 60 is of course configured with notches which individually match in shape with the portions of the light conductor 14 where the light sources 16 and 18 are mounted. This allows the light sources 16 and 18 to be accommodated in the opening 58 when the light conductor 14 is coupled thereinto. The reference numeral 62 in FIG. 7 designates a lens mount which is fastened to the camera casing 60 by means of screws. The lens mount 62 is a C-mount, one of industry standard lens mounts.

As previously mentioned, the opposite major surfaces of the light conductor 14 extend parallel to the surface of the photoelectric transducer section of the imaging device 12. Each of the light outlet portions 54 and 56 of the light conductor 14 is oriented such that the light projected therefrom proceeds within a plane which is parallel to the array of the stripes in the color separation filter and perpendicular to the photoelectric transducer section surface, as shown in FIGS. 8 and 9.

Figure 8:
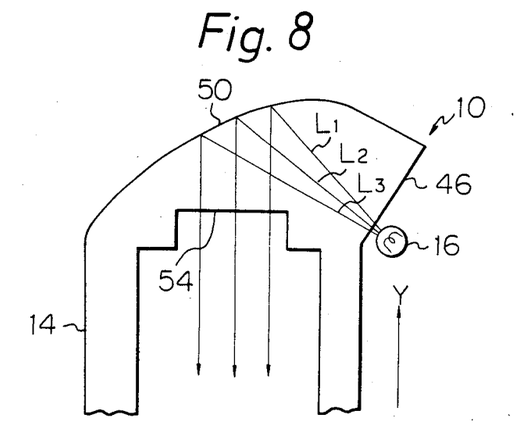
FIGS. 8 and 9 are diagrams illustrating a manner of bias light propagation in a light conducting member of a bias light supply device.

In detail, as shown in FIG. 8, the light source 16 is positioned adjacent to the focus of the parabolic the reflective portion 50 of the light conductor 14. Light rays $L_1$, $L_2$ and $L_3$ emanating from the light source 16 are individually reflected by the reflective portion 50 to be radiated from the light outlet portion 54 (light rays from the other light source 18 are steered in the same manner and, therefore, description thereof will be omitted for simplicity). The light rays coming out from the light conductor 14 respectively propagate along planes which are perpendicular to the sheet surface of FIG. 8 and parallel to a direction Y, that is, parallel to the stripes in the stripe filter and intersecting the face 11a of the transducer section 11 (shown in FIG. 9) at a right angle. FIG. 9 illustrates the propagation of the light ray $L_1$, for example, as viewed from a side of the light conductor 14. As shown in FIG. 9, the light ray $L_1$ reflected by the portion 50 advances in various different directions in the specific plane described above. The reflected light includes a component $B_1$ advancing toward the face 11a of the transducer section 11, a component $B_2$ advancing along the general direction in which the light conductor 14 extends, and a component $B_3$ advancing away from the face 11a of the transducer section 11. In accordance with the present invention, only the light component $B_1$ serves as effective bias light. In order that the specific component $B_1$ may be efficiently routed toward the face 11a of the transducer section 11, it is preferable to, for example, position the light source 16 offset toward the front end of the light conductor 14 as shown in FIG. 9. Where the light source 16 is a lamp, its filament may be disposed in such a manner as to attain the above-described effect. Under this condition, the bias light coming out from the light conductor 14 produces a clear-cut shadow of the filter to be projected on the photoconductive layer, whereby the imaging device 12 is capable of generating a color composite TV video signal as an output signal thereof even when supplied with the bias light only.

A carrier color signal appears in the output signal of the imager 12 in correspondence with the bias light which is applied from the bias light supply device 10 to the imaging device 12 through the color separation filter. In accordance with the present invention, when the carrier color signals are applied to the demodulators 36 and 38, they are made greater than the peak-to-peak value of noise which is applied as an input to the demodulators 36 and 38, in order that improved color reproducibility of dark areas may be achieved. This can be realized with ease by providing a necessary control over one or both of quantity and color temperature of the bias light which is directed from the device 10 toward the imaging device 12 via the filter.

Concerning the bias light supply device 10 in accordance with the present invention, any desired construction and arrangement may be employed insofar as it is capable of generating a color signal changed into carriers, even in a small amount, in the output signal of the imaging device 12 in response to the bias light. Nevertheless, the device 10 of the type described above with reference to FIGS. 6 and 9 is favorably applicable to the color TV camera of the present invention, taking into account its various advantages such as that the quantity and color temperature of bias light are readily adjustable and that carrier color signals are efficiently generated in response to bias light.

Figure 9:
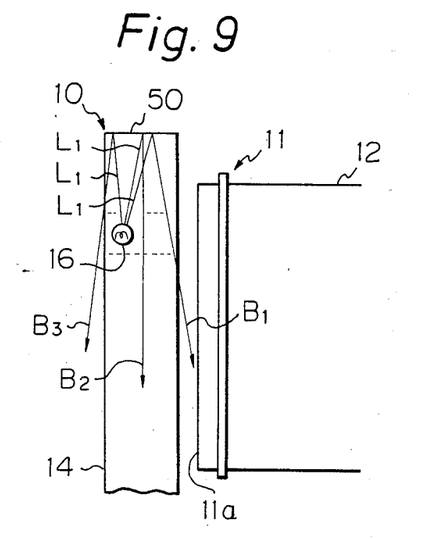

In the bias supply device 10 shown in FIGS. 6 and 9, the quantity of bias light is controllable merely by controlling the quantity of light emanating from the light sources 16 and 18. The color temperature, on the other hand, may be changed by, for example, fitting color temperature conversion filters (not shown) on the light outlet portions 54 and 56 of the light conductor 14. Because each of the light outlet portions 54 and 56 has a relatively small area, it requires only a small size color temperature conversion filter and, thereby, promotes easy color temperature adjustment.

Although the light source of the bias light may have any color temperature, the light source having a color temperature of 3,200° K. is desirable since it will not upset once adjusted white balance after a prolonged use during which the light quantity may vary with aging. Furthermore, if the light source is selected to have a color temperature which develops a great amount of carrier color signal in the output signal of the imaging device 12, it will meet the objective of the present invention with a smaller quantity of bias light emitted from the light source. If desired, the light conductor 14 itself may be constructed and used as a color temperature conversion filter, instead of providing aforementioned specially prepared filters.

In summary, it will be seen that the present invention provides a color TV imaging apparatus which offers excellent color reproducibility even of dark scenes and improves the S/N ratio in the reproduction of pictures.

Various modifications will become possible for those skilled in the art after receiving the teachings of the present disclosure without departing from the scope thereof.

What is claimed is:

1. A color television imaging apparatus with improved color reproducibility in a dark area of a scene deteriorated due to noise, said imaging apparatus comprising:
    a color television imaging device for generating a composite color television video signal, said device including a photoelectric transducer section and a color separation stripe filter;
    at least two demodulators for individually producing color signal components by demodulating carrier color signals each of which is derived from an output signal of the imaging device;
    bias light supply means for applying bias light to the photoelectric transducer section of the imaging device through the color separation stripe filter; and
    bias light control means for maintaining the carrier color signals to be demodulated at a value which is greater than the peak-to-peak value of noise which is contained in the color signals by controlling said bias light supply means.

2. A color television imaging apparatus as claimed in claim 1, in which the bias light control means comprises at least means for adjusting the quantity of the bias light or means for changing the color temperature of the bias light.

3. A color television imaging apparatus as claimed in claim 2, in which the bias light supply means comprises a flat light conducting member positioned parallel to a surface of the photoelectric transducer section and formed with a light inlet portion, a reflective portion and a light outlet portion, and a bias light source for emitting light toward said light inlet portion of the light conducting element, the quantity of light emitted from said bias light source being adjustable.

4. A color television imaging apparatus as claimed in claim 3, in which the light quantity adjusting means of the bias light control means controls the quantity of light emitted by the bias light source.

5. A color television imaging apparatus as claimed in claim 3, in which the bias light color temperature changing means of the bias light control means comprises a color temperature conversion filter which is positioned in the light outlet portion of the bias light supply means.

6. A color television imaging apparatus as claimed in claim 2, in which the bias light is changed to a color temperature of 3,200° K. by said color temperature changing means.

7. A color television imaging apparatus as claimed in claim 1, in which the color separation stripe filter comprises a group of color filter stripes of different colors being arranged in a predetermined order, at least one color of said color filter stripes being a complementary color.

* * * * *